(12) United States Patent
Oike et al.

(10) Patent No.: US 8,570,417 B2
(45) Date of Patent: Oct. 29, 2013

(54) SOLID-STATE IMAGING DEVICE AND CAMERA SYSTEM

(75) Inventors: Yusuke Oike, Kanagawa (JP); Masaki Sakakibara, Kanagawa (JP); Tadayuki Taura, Kanagawa (JP)

(73) Assignee: Sony Corporation (JP)

( * ) Notice: Subject to any disclaimer, the term of this patent is extended or adjusted under 35 U.S.C. 154(b) by 189 days.

(21) Appl. No.: 12/731,710

(22) Filed: Mar. 25, 2010

(65) Prior Publication Data

US 2010/0259662 A1  Oct. 14, 2010

(30) Foreign Application Priority Data

Apr. 8, 2009 (JP) ................................. 2009-094110

(51) Int. Cl.
  *H04N 3/14* (2006.01)
  *H04N 5/335* (2011.01)
  *H01L 37/00* (2006.01)

(52) U.S. Cl.
  USPC ........................................ 348/308; 250/208.1

(58) Field of Classification Search
  USPC ............................ 348/308, 300, 302, 304, 307
  See application file for complete search history.

(56) References Cited

U.S. PATENT DOCUMENTS

| | | | |
|---|---|---|---|
| 6,445,763 B1 * | 9/2002 | Hoffman ........................ | 378/19 |
| 6,844,898 B1 * | 1/2005 | Conrads et al. ............... | 348/308 |
| 7,092,021 B2 * | 8/2006 | Fossum et al. ................ | 348/305 |
| 7,570,293 B2 * | 8/2009 | Nakamura ..................... | 348/308 |
| 7,746,400 B2 * | 6/2010 | Mo ................................ | 348/308 |
| 7,999,870 B2 * | 8/2011 | Compton et al. .............. | 348/308 |
| 2005/0259169 A1 * | 11/2005 | Ito et al. ........................ | 348/308 |
| 2006/0050162 A1 * | 3/2006 | Nakamura ..................... | 348/308 |
| 2008/0258042 A1 * | 10/2008 | Krymski ..................... | 250/208.1 |
| 2009/0219420 A1 * | 9/2009 | Kuroda ......................... | 348/281 |
| 2010/0079611 A1 * | 4/2010 | Suzuki et al. ............. | 348/222.1 |
| 2010/0245647 A1 * | 9/2010 | Honda et al. .................. | 348/308 |
| 2010/0283881 A1 * | 11/2010 | Araki et al. ................... | 348/308 |

FOREIGN PATENT DOCUMENTS

| | | |
|---|---|---|
| JP | 2003-234967 | 8/2003 |
| JP | 2006-080861 | 3/2006 |
| JP | 2006-340044 | 12/2006 |

* cited by examiner

*Primary Examiner* — John Villecco
(74) *Attorney, Agent, or Firm* — Sheridan Ross P.C.

(57) ABSTRACT

A solid-state imaging device includes a pixel array section including a plurality of pixels, a pixel drive line controlling driving the pixels in each row, a signal line reading an analog signal of the pixels in each column, a pixel drive unit driving the pixels to perform a readout through the pixel drive line, and a readout circuit capable of converting the analog signal into a digital signal. At least the number of pixel drive lines or the number of signal lines is more than one, and the pixels of each pixel group are connected to different lines of either the pixel drive lines or the signal lines. The pixel drive unit sequentially drives the pixels in the pixel group at shifted timings, and the readout circuit includes an analog-to-digital converter sequentially receiving analog signals from the pixel group and sequentially converting the analog signals into digital signals.

7 Claims, 15 Drawing Sheets

SOLID-STATE IMAGING DEVICE AND CAMERA SYSTEM

BACKGROUND OF THE INVENTION

1. Field of the Invention

The present invention relates to a solid-state imaging device such as a complementary metal oxide semiconductor (CMOS) image sensor and a camera system.

2. Description of the Related Art

As such a solid-state imaging device (image sensor), a charge coupled device (CCD), the CMOS, and the like are widely used in practice.

In general, with the solid-state imaging device such as the CCD and the CMOS image sensor, an analog signal obtained by a photoelectric conversion element was converted into digital data to be recorded using an analog-to-digital (AD) converter separate from the solid-state imaging device.

Presently, to increase the processing speed and to reduce the size, the solid-state imaging device and the AD converter are integrated in one chip or one package.

As solid-state imaging devices that operate at high speed, various devices are proposed (see, for example, Japanese Unexamined Patent Application Publication Nos. 2006-340044, 2006-80861, and 2003-234967).

The solid-state imaging device disclosed in Japanese Unexamined Patent Application Publication No. 2006-340044 not only integrates one or more AD converters but also integrates thousands of AD converters in a column parallel manner, resulting in high speed.

The solid-state imaging device disclosed in Japanese Unexamined Patent Application Publication No. 2006-80861 includes a column parallel sample and hold circuit, in which a plurality of columns share a pipelined AD converter, resulting in high speed.

The solid-state imaging device disclosed in Japanese Unexamined Patent Application Publication No. 2003-234967 also includes the column parallel sample and hold circuit and uses the pipelined AD converter, like the technology disclosed in Japanese Unexamined Patent Application Publication No. 2006-80861 described above.

SUMMARY OF THE INVENTION

The solid-state imaging device disclosed in Japanese Unexamined Patent Application Publication No. 2006-340044 integrates thousands of AD converters in the column parallel manner as shown in FIG. 1 of Japanese Unexamined Patent Application Publication No. 2006-340044.

Therefore, in the solid-state imaging device, the number of the AD converters as well as the footprint and the power consumption increases as the resolution increases.

Furthermore, to reduce the size of a unit AD converter in the solid-state imaging device, it is difficult to use the pipelined AD converter that has a large footprint while generally operating at high speed, and a relatively low-speed successive-approximation type AD converter or the like is used.

Accordingly, though the high speed of the solid-state imaging device has been obtained by parallelization, there are issues of increase of the footprint and the power consumption and a limit to the increase of the processing speed.

By providing the column parallel sample and hold circuit, the solid-state imaging device disclosed in Japanese Unexamined Patent Application Publication No. 2006-80861 enables the plurality of the columns to share the AD converter and overlap a time period of reading a signal from the imaging device with a time period of AD conversion.

However, when such a successive-approximation type AD converter as used in Japanese Unexamined Patent Application Publication No. 2006-340044 is used, each column starts a process after completion of AD conversion performed by the previous column, and therefore the processing speed is lowered in accordance with the number of the columns.

Furthermore, the solid-state imaging device disclosed in Japanese Unexamined Patent Application Publication No. 2006-80861 performs the AD conversion at a high throughput using the pipelined AD converter, thereby increasing an area efficiency and the processing speed by sharing the pipelined AD converter among the plurality of the columns.

However, because the additional sample and hold circuits for the analog signal generally use a large capacitative element in each column, an increase of the footprint is not negligible.

Furthermore, because the sample and hold circuit generates a thermal noise (kT/C noise), adding the sample and hold device degrades an image quality.

However, all the pipeline stages are not operating at all time, and therefore an operation rate of the AD converter lowers hardly showing the high-speed performance when the time period of reading or sampling and holding is long.

The solid-state imaging device disclosed in Japanese Unexamined Patent Application Publication No. 2003-234967 also involves such a disadvantage as with the solid-state imaging device disclosed in Japanese Unexamined Patent Application Publication No. 2006-80861.

That is, the configuration in which the plurality of the columns share the AD converter provides such merits as the decrease of the footprint and the power consumption of the AD converter as well as the possibility of using the high-speed pipelined AD converter.

On the other hand, the sample and hold circuit used for the above configuration not only (1) increases the footprint, but also (2) becomes a noise source to degrade the image quality. Moreover, there is still another disadvantage in that the operation rate of the AD converter lowers and therefore (3) it is difficult to adequately derive high-speed performance from the AD converter.

Therefore, it is desirable to provide a solid-state imaging device and a camera system that eliminate any sample and hold circuit and that can prevent degradation of the image quality caused by the increased noise, the increase of the footprint, and the decrease of the processing speed.

A solid-state imaging device according to an embodiment of the present invention includes a pixel array section configured to include a plurality of pixels having a photoelectric conversion function of converting an optical signal into an electric signal arranged in a form of a two-dimensional array, a pixel drive line configured to control driving the pixels arranged in each row corresponding to a row arrangement of the pixels, a signal line configured to read out a readout signal of the pixels arranged in each column corresponding to a column arrangement of the pixels, a pixel drive unit configured to drive the pixels so as to perform a readout through the pixel drive line, and a readout circuit configured to have a function of converting an analog signal received from the signal line into a digital signal. At least the number of pixel drive lines wired in each row or the number of signal lines wired in each column is more than one. A pixel group is formed of a plurality of pixels in the pixel array section, the number of pixels being determined from the number of pixel drive lines wired in each row and the number of signal lines wired in each column. The pixels in the pixel group are connected to different lines of either the pixel drive lines or the signal lines. The pixel drive unit sequentially drives the pixels in the pixel group at timings of a shifted phase to read out the analog signal through a corresponding one of the signal lines. The readout circuit includes an analog-to-digital converter configured to sequentially receive analog signals read out from the pixel group by the plurality of the signal lines and sequentially convert the analog signals into digital signals.

A camera system according to another embodiment of the present invention includes a solid-state imaging device, an optical system configured to form a subject image on the solid-state imaging device, and a signal processing circuit configured to process an image signal output from the solid-state imaging device. The solid-state imaging device includes a pixel array section configured to include a plurality of pixels having a photoelectric conversion function of converting an optical signal into an electric signal arranged in a form of a two-dimensional array, a pixel drive line configured to control driving the pixels arranged in each row corresponding to a row arrangement of the pixels, a signal line configured to read out a readout signal of the pixels arranged in each column corresponding to a column arrangement of the pixels, a pixel drive unit configured to drive the pixels so as to perform a readout through the pixel drive line, and a readout circuit configured to have a function of converting an analog signal received from the signal line into a digital signal. At least the number of pixel drive lines wired in each row or the number of signal lines wired in each column is more than one. A pixel group is formed of a plurality of pixels in the pixel array section, the number of pixels being determined from the number of pixel drive lines wired in each row and the number of signal lines wired in each column. The pixels in the pixel group are connected to different lines of either the pixel drive lines or the signal lines. The pixel drive unit sequentially drives the pixels in the pixel group at timings of a shifted phase to read out the analog signal through a corresponding one of the signal lines. The readout circuit includes an analog-to-digital converter configured to sequentially receive analog signals read out from the pixel group by the plurality of the signal lines and sequentially convert the analog signals into digital signals.

According to embodiments of the present invention, any sample and hold circuit is eliminated, and the degradation of the image quality caused by the increased noise, the increase of the footprint, and the decrease of the processing speed can be prevented.

DESCRIPTION OF THE PREFERRED EMBODIMENTS

Embodiments of the present invention will be explained below in association with accompanying drawings in the following order.

1. Embodiment (first exemplary configuration of solid-state imaging device)
2. Another embodiment (second exemplary configuration of solid-state imaging device)
3. Still another embodiment (third exemplary configuration of solid-state imaging device)
4. Yet another embodiment (fourth exemplary configuration of solid-state imaging device)
5. Yet another embodiment (exemplary configuration of camera system)

1. Embodiment

Figure 1:
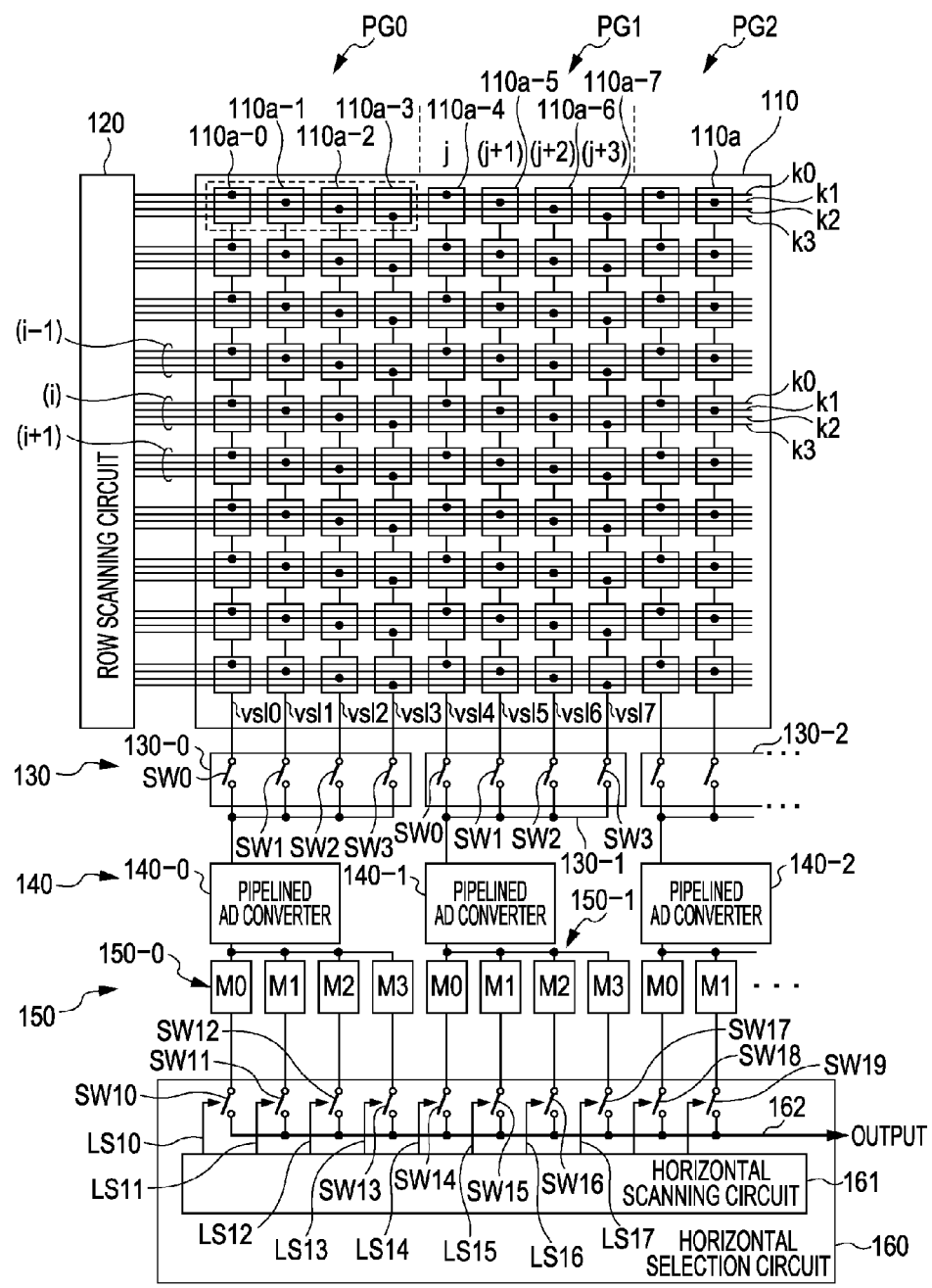
FIG. 1 illustrates an example of the configuration of a solid-state imaging device according to an embodiment of the present invention.

FIG. 1 illustrates an example of the configuration of a solid-state imaging device according to an embodiment of the present invention.

This embodiment is explained below using a complementary metal oxide semiconductor (CMOS) image sensor 100 as a solid-state imaging device.

The CMOS image sensor 100 includes a pixel array section 110, a row scanning circuit 120 that serves as a pixel drive unit, a multiplexer group 130, a pipelined AD converter group 140, a memory array group 150, and a horizontal selection circuit 160.

A readout circuit is formed of the multiplexer group 130, the pipelined AD converter group 140, the memory array group 150, and the horizontal selection circuit 160.

The pixel array section 110 includes a plurality of pixel circuits 110a configured to perform a photoelectric conversion arranged in a form of a two-dimensional array (matrix) of M rows by N columns.

FIG. 1 shows the pixel array section 110 in which the pixel circuits 110a are arranged in a form of a 10×10 matrix, as an example.

In the embodiment, a plurality of horizontal pixel drive lines k (k0 to k3) configured to drive each pixel row are arranged in each row, and the horizontal pixel drive lines k0 to k3 are connected to one of pixels in the corresponding row.

The same number of the pixel circuits 110a as the number of the horizontal pixel drive lines k0 to k3 arranged in each row form pixel groups PG0, PG1, . . . .

The plurality of the pixel circuits 110a in the pixel groups PG0, PG1, . . . are connected to different horizontal pixel drive lines k0 to k3.

A vertical signal output line vsl configured to read out an output signal from a pixel is also connected to each column, and a plurality of columns share a single AD converter.

Figure 2:
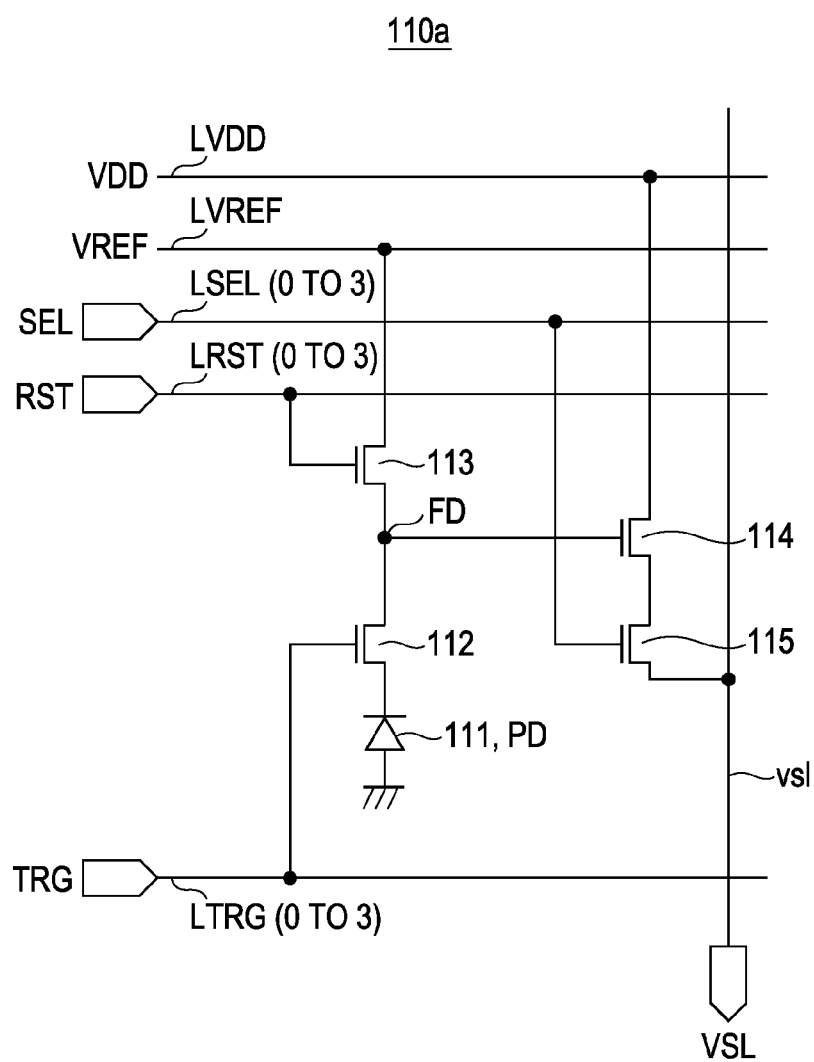
FIG. 2 illustrates an example of a pixel of a CMOS image sensor including four transistors according to the embodiment.

FIG. 2 illustrates an example of a pixel of a CMOS image sensor including four transistors according to the embodiment.

The pixel circuit 110a includes a photoelectric conversion element 111 including, for example, a photodiode (PD).

The pixel circuit 110a further includes four transistors including a transfer transistor 112, a reset transistor 113, an amplification transistor 114, and a selection transistor 115 as active elements for a single photoelectric conversion element 111.

The photoelectric conversion element 111 photoelectrically converts an incident light into an amount of electric charge (electrons in this case) corresponding to an amount of the light.

The transfer transistor 112 is connected between the photoelectric conversion element 111 and a floating diffusion FD that serves as an output node, and its gate (transfer gate) receives a transfer signal TRG that serves as a control signal through a transfer control line LTRG.

This enables the transfer transistor 112 to transfer the electron photoelectrically converted by the photoelectric conversion element 111 to the floating diffusion FD.

The reset transistor 113 is connected between a power line LVREF and the floating diffusion FD, and its gate receives a reset signal RST that serves as the control signal through a reset control line LRST.

This enables the reset transistor 113 to reset a potential of the floating diffusion FD to the potential of the power line LVREF.

A gate of the amplification transistor 114 is connected to the floating diffusion FD. The amplification transistor 114 is connected to the vertical signal output line vsl via the selection transistor 115 to form a source follower along with a constant current source outside the pixel section.

A selection signal SEL that serves as the control signal corresponding to an address signal is provided to a gate of the selection transistor 115 through a selection control line LSEL to turn on the selection transistor 115.

When the selection transistor 115 is turned on, the amplification transistor 114 amplifies the potential of the floating diffusion FD and outputs the voltage corresponding to the potential to the vertical signal output line vsl.

A voltage output from each pixel is input to a corresponding multiplexer in the multiplexer group 130 of the column readout circuit through the vertical signal output line vsl.

A set of the reset control line LRST, the transfer control line LTRG, and the selection control line LSEL, each wired to the pixel array section 110, forms the horizontal pixel drive lines k0 to k3, which are a plurality of wirings in each row.

In other words, the horizontal pixel drive line k0 is formed of three control lines of a reset control line LRST0, a transfer control line LTRG0, and a selection control line LSEL0.

In the same manner, the horizontal pixel drive line k1 is formed of three control lines of a reset control line LRST1, a transfer control line LTRG1, and a selection control line LSEL1.

The horizontal pixel drive line k2 is formed of three control lines of a reset control line LRST2, a transfer control line LTRG2, and a selection control line LSEL2.

The horizontal pixel drive line k3 is formed of three control lines of a reset control line LRST3, a transfer control line LTRG3, and a selection control line LSEL3.

In the pixel array section 110 according to the embodiment, four horizontal pixel drive lines k0 to k3 are wired in each row.

In accordance with this, four successive columns of the pixel circuits 110a in each row are respectively connected to the horizontal pixel drive lines k0 to k3. The following four successive columns of pixel circuits are then respectively connected to the horizontal pixel drive lines k0 to k3.

Taking an example of the zeroth row in FIG. 1, a pixel circuit 110a-0 in the zeroth column is connected to the horizontal pixel drive line k0, and a pixel circuit 110a-1 in the first column is connected to the horizontal pixel drive line k1. Furthermore, a pixel circuit 110a-2 in the second column is connected to the horizontal pixel drive line k2, and a pixel circuit 110a-3 in the third column is connected to the horizontal pixel drive line k3.

A pixel circuit 110a-4 in the fourth column is connected to the horizontal pixel drive line k0, and a pixel circuit 110a-5 in the fifth column is connected to the horizontal pixel drive line k1. Moreover, a pixel circuit 110a-6 in the sixth column is connected to the horizontal pixel drive line k2, and a pixel circuit 110a-7 in the seventh column is connected to the horizontal pixel drive line k3.

Following pixel circuits are connected in the same manner.

In short, according to the embodiment, when x horizontal pixel drive lines are connected to each row, x successive columns of the pixel circuits are assumed as a single row pixel group PG0, PG1, . . . in each row, and the pixel circuits 110a are connected to different horizontal pixel drive lines in each row pixel group.

A plurality of the pixel groups in a column direction are made possible to be read out at different timings of overlapping periods.

According to the embodiment, a phase of a horizontal synchronization signal for the readout differs from pixel to pixel in the plurality of the pixel groups, whereby a single AD converter can be shared for reading out a plurality of pixels.

The row scanning circuit 120 drives the horizontal pixel drive lines k0 to k3 including the reset control line LRST, the transfer control line LTRG, and the selection control line LSEL to be read out at the different timings of the overlapping periods in the plurality of the pixel groups in the column direction.

The row scanning circuit 120 controls an operation of the pixel circuit 110a arranged at an arbitrary row of the pixel array section 110. The row scanning circuit 120 controls each pixel circuit 110a through the control lines LSEL, LRST, and LTRG.

The multiplexer group 130 includes multiplexers 130-0, 130-1, . . . disposed corresponding to the row pixel groups PG0, PG1, . . . in the pixel array section 110.

Each of the multiplexers 130-0, 130-1, . . . is connected with x (four in this example) vertical signal output lines vsl to be connected to each pixel circuit 110a in each row pixel group PG0, PG1, . . . .

As described above, according to the embodiment, because the timings of the readout of the horizontal pixel drive lines k0 to k3 wired together in each row are different, readout timings of analog signals read by x vertical signal output lines vsl are shifted.

The multiplexers 130-0, 130-1, . . . sequentially select an analog signal VSL read by the x connected vertical signal output lines vsl, and transfer the analog signal VSL to the corresponding AD converter in the pipelined AD converter group 140.

Each of the multiplexers 130-0, 130-1, . . . includes switches SW0 to SW3 connected to the x vertical signal output lines vsl.

The switches SW0 to SW3 are sequentially turned on and off by selection signals m0 to m3 corresponding to the timings of the readout of the horizontal pixel drive lines k0 to k3 wired together in each row.

In FIG. 1, the switch SW0 of the multiplexer 130-0 is connected to a vertical signal output line vsl0 in the zeroth column, and the switch SW1 is connected to a vertical signal output line vsl1 in the first column. Furthermore, the switch SW2 of the multiplexer 130-0 is connected to a vertical signal output line vsl2 in the second column, and the switch SW3 is connected to a vertical signal output line vsl3 in the third column.

A switch SW0 of the multiplexer 130-1 is connected to a vertical signal output line vsl4 in the fourth column, and a switch SW1 is connected to a vertical signal output line vsl5 in the fifth column. Furthermore, a switch SW2 of the multiplexer 130-1 is connected to a vertical signal output line vsl6 in the sixth column, and a switch SW3 is connected to a vertical signal output line vsl7 in the seventh column.

The pipelined AD converter group 140 includes AD converters 140-0, 140-1, . . . disposed corresponding to the multiplexers 130-0, 130-1, . . . disposed corresponding to the row pixel groups PG0, PG1, . . . of the multiplexer group 130.

Each of the AD converters 140-0, 140-1, . . . is capable of so-called a pipelined operation, which includes a plurality of stages so as to sequentially receive inputs.

Figure 3:
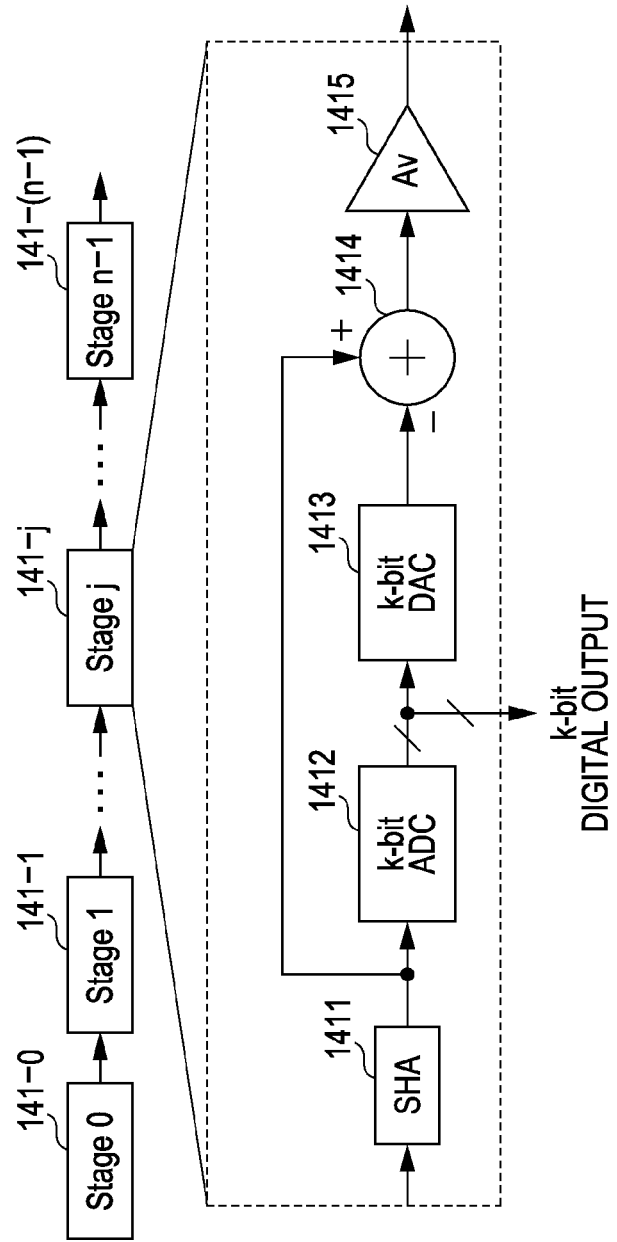
FIG. 3 illustrates an example of the configuration of a typical pipelined AD converter.

FIG. 3 illustrates an example of the configuration of a typical pipelined AD converter.

The pipelined AD converter shown in FIG. 3 includes n stages 141-0 to 141-(n−1).

Each stage 141 (−0 to −(n−1)) includes a sample and hold circuit (SHA) 1411 that samples an output from the previous stage, a k-bit AD converter 1412, and a digital-analog converter (DAC) 1413.

Each stage 141 (−0 to −(n−1)) further includes an analog adder and subtracter 1414 and an amplifier 1415.

A conversion bit rate of each stage can be any grade such as 1 bit, 1.5 bits to set two thresholds and output three values, and 2 bits to set three thresholds, and the conversion bit rate may often vary with respect to each stage.

For example, when the conversion bit rate of each stage is 1 bit, a pipelined configuration of four or sixteen stages forms a 16-bit AD converter. In this case, upon completion of the 1-bit AD conversion at the first stage, the signal is transmitted to the next stage, and therefore the first stage can receive the next input signal.

It is desirable to sequentially shift the timings of the readout of the horizontal pixel drive lines k0 to k3 by a time corresponding to the throughput of the pipelined AD converter.

The memory array group 150 is divided into memories 150-0, 150-1, . . . that include m (four in this example) memories M0 to M3 corresponding to the AD converters 140-0, 140-1, . . . in the pipelined AD converter group 140.

The four memories M0 to M3 in each of memory groups 150-0, 150-1, . . . store (latch) therein digital data received from the corresponding one of the AD converters 140-0, 140-1, . . . .

The horizontal selection circuit 160 includes a horizontal scanning circuit 161, a horizontal transfer line 162, and selection lines LS10 to LS17, . . . disposed between readout ports of the memories M0 to M3 of the memory groups 150-0, 150-1, . . . and the horizontal transfer line 162.

The horizontal selection circuit 160 includes the selection lines LS10 to LS17, . . . to selectively drive the switches SW10 to SW17, . . . .

The horizontal scanning circuit 161 sequentially drives the selection lines LS10 to LS17, . . . to control the switches SW10 to SW17, . . . to turn on and off, and makes the horizontal transfer line 162 to read out the data from the memories M0 to M3 in the memory groups 150-0, 150-1, . . . .

The data transferred by the horizontal transfer line 162 is input to a signal processor via an amplifier (not shown) to form a two-dimensional image.

Figure 4:
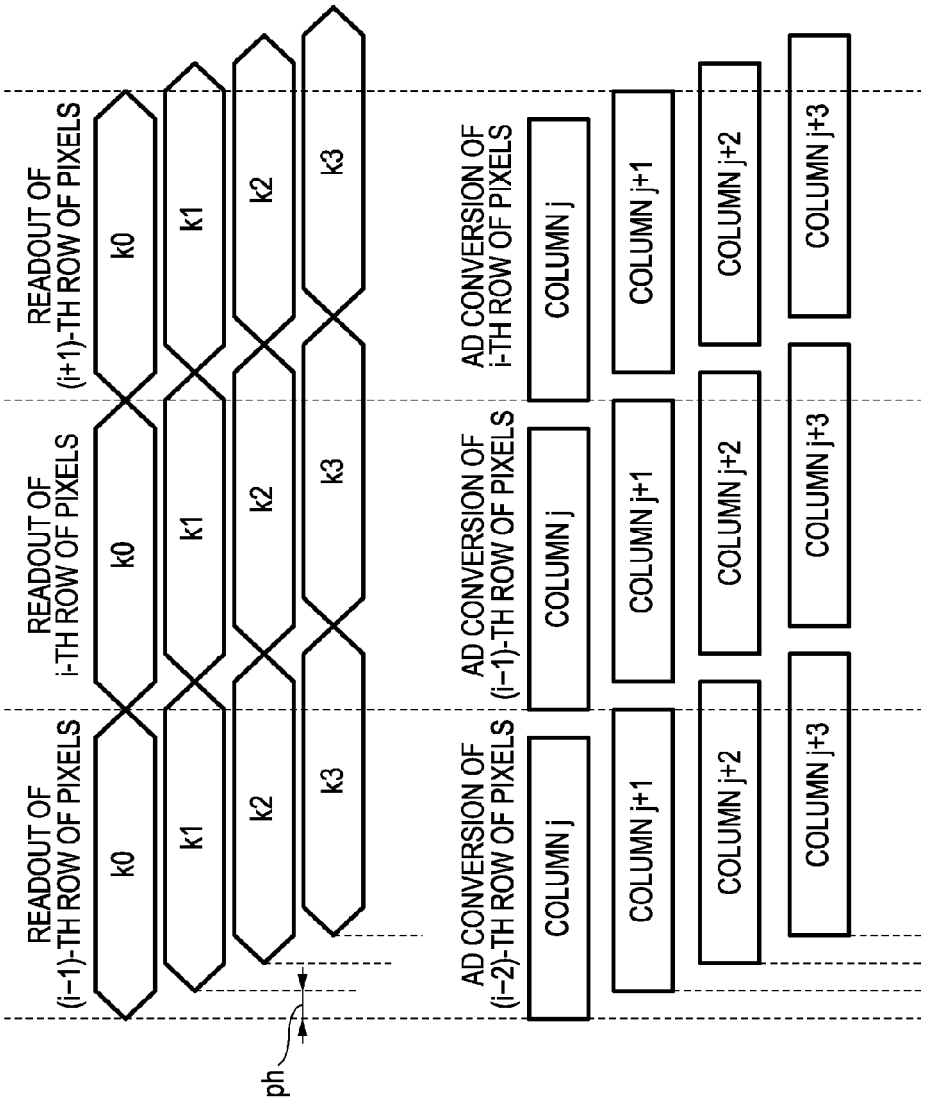
FIG. 4 is a timing diagram of a pixel readout and an AD converting operation performed by the CMOS image sensor according to the embodiment.

FIG. 4 is a timing diagram of a pixel readout and an AD converting operation performed by the CMOS image sensor according to the embodiment.

Figure 5:
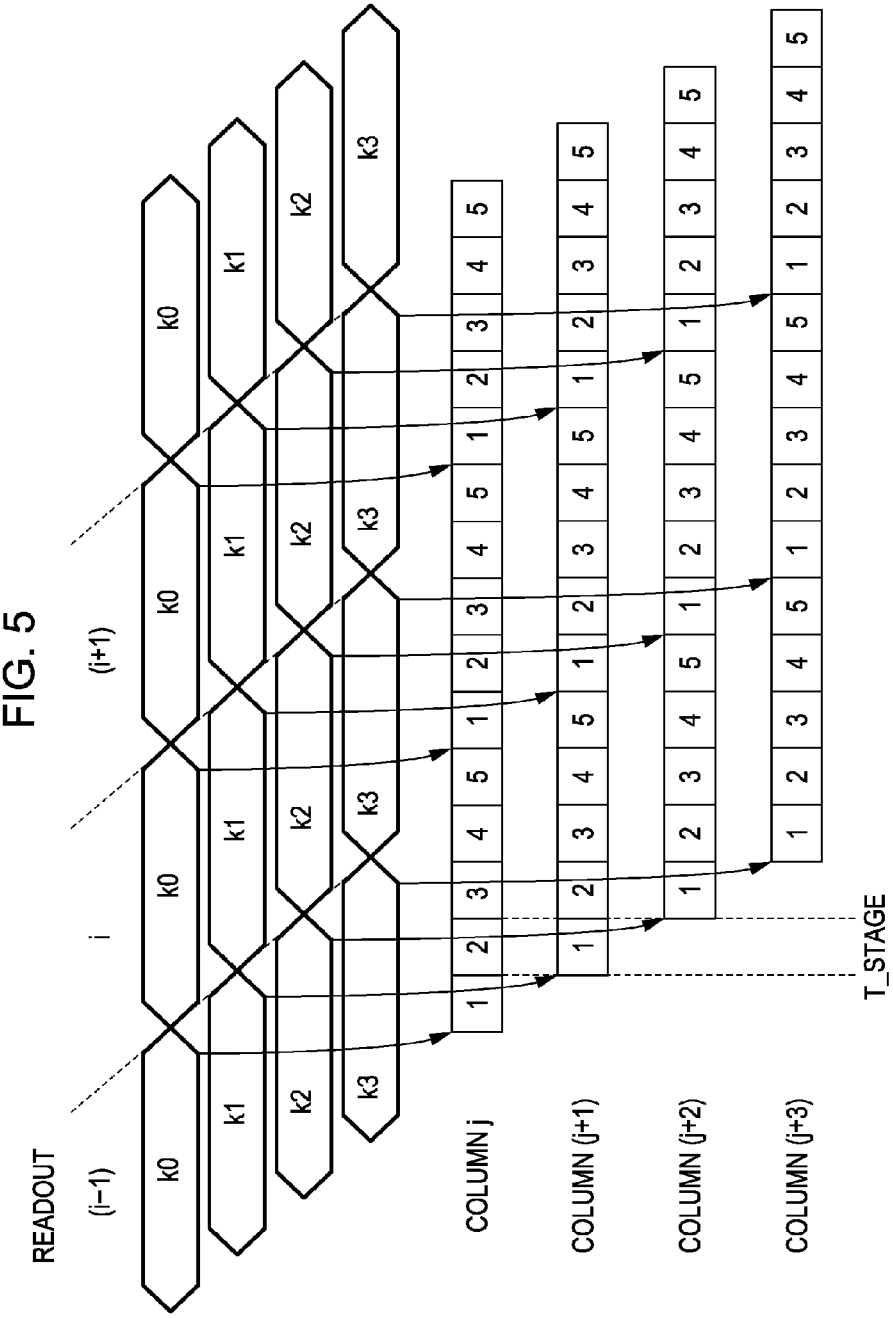
FIG. 5 is another timing diagram of the pixel readout and the AD converting operation performed by the CMOS image sensor according to the embodiment.

FIG. 5 is another timing diagram of the pixel readout and the AD converting operation performed by the CMOS image sensor according to the embodiment.

Figure 6:
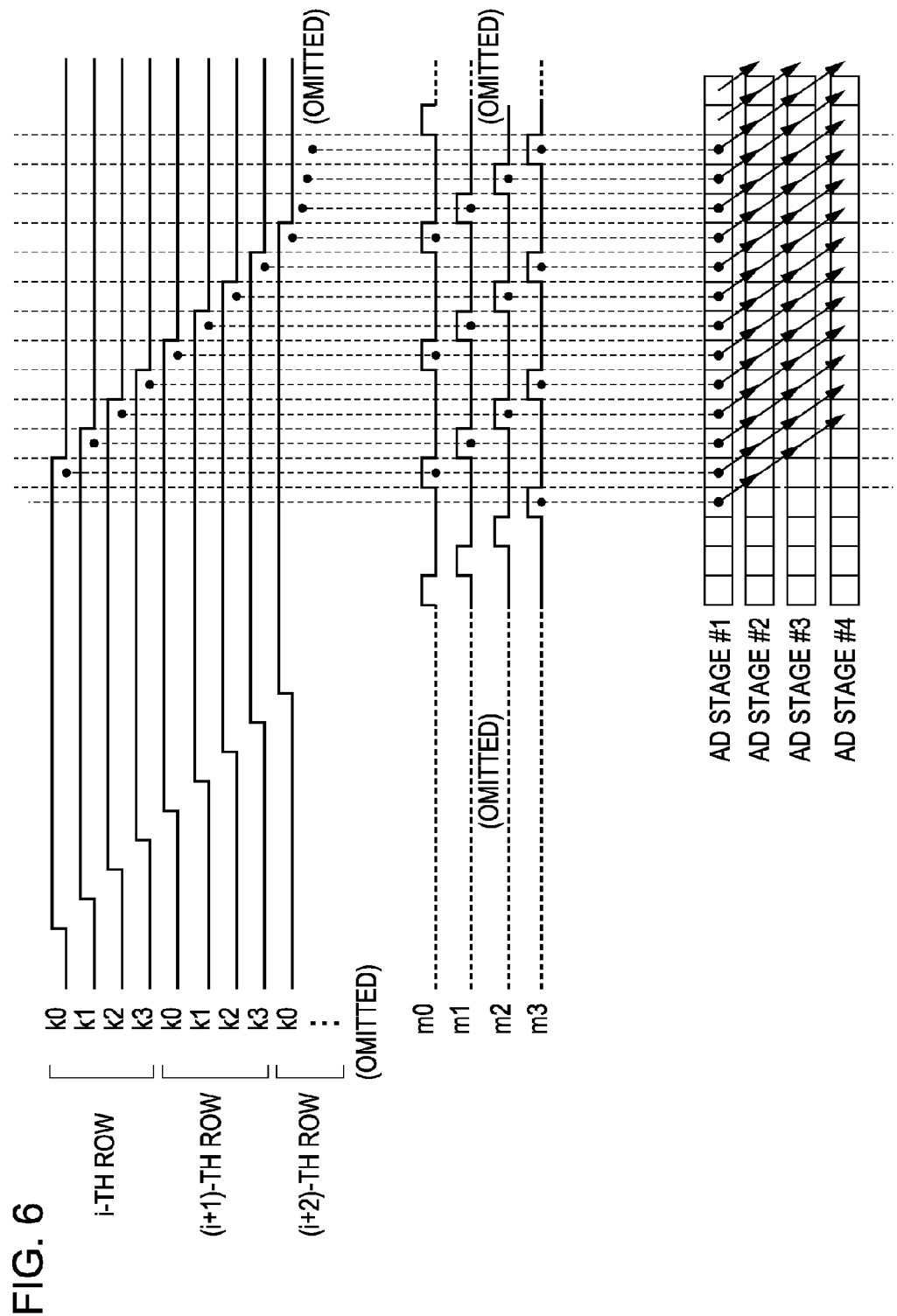
FIG. 6 is a timing diagram of the pixel readout, a selecting operation of a multiplexer, and the AD converting operation, which illustrates an example of driving the entire CMOS image sensor according to the embodiment.

FIG. 6 illustrates an example of driving the entire CMOS image sensor according to the embodiment. FIG. 6 shows timings of the pixel readout, a selecting operation of the multiplexer, and the AD converting operation.

As described above, according to the embodiment, four horizontal pixel drive lines k0 to k3 are wired in each row. Selection signals (pulse signals) for the multiplexers 130 that switch output signals for sharing the AD converter are denoted m0 to m3.

In the CMOS image sensor 100 according to the embodiment, a plurality of the horizontal pixel drive lines are wired in each row, and a single vertical signal output line is wired in each column.

The plurality (four in this example) of the horizontal pixel drive lines k0, k1, k2, and k3 wired together in each row are connected to pixels in different columns, and are capable of driving the pixels at different timings by the row scanning circuit 120.

Driven by the row scanning circuit 120, as shown in FIGS. 4 to 6, the readout of the i-th pixel row is started by the horizontal pixel drive lines k0, k1, k2, and k3 at different phases with respect to each column. In other words, the row scanning circuit 120 drives and reads out the four pixels of the pixel group PG at timings shifted by a phase ph.

Upon completion of the readout, analog signals selected by the multiplexers 130-0, 130-1, . . . configured to select a column to output a pixel and read from the pixel are input to the pipelined AD converters 140-0, 140-1, . . . .

According to the embodiment, a plurality (four in this example) of columns in the pixel array section 110 share a single AD converter, and the phases of the timing to read out the shared pixels are shifted by the row scanning circuit 120 and the like.

This allows the CMOS image sensor 100 according to the embodiment to eliminate sample and hold circuits, thereby reducing the circuit footprint for the sample and hold circuit and preventing degradation of the image quality due to a thermal noise (kT/C noise) generated by the sample and hold circuit.

Furthermore, because there is no time taken for sampling and holding, a high frame rate can be achieved by increasing an operation rate of the AD converter by matching the readout time to the number of the pixel drive lines that share the AD converter.

2. Another Embodiment

Figure 7:
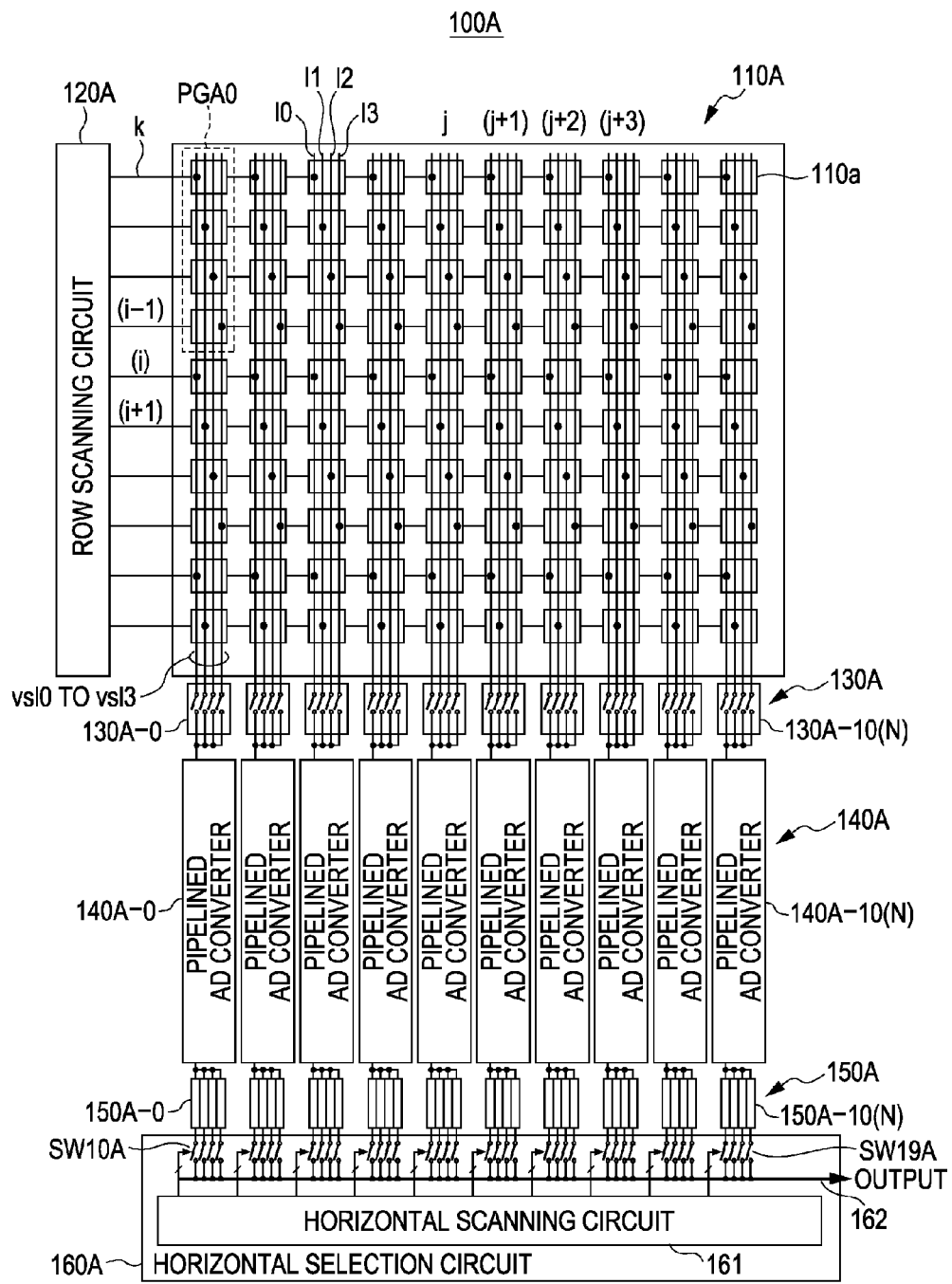
FIG. 7 illustrates an example of the configuration of a solid-state imaging device (CMOS image sensor) according to another embodiment of the present invention.

FIG. 7 illustrates an example of the configuration of a solid-state imaging device (CMOS image sensor) according to another embodiment of the present invention.

A CMOS image sensor 100A according to the other embodiment is different from the CMOS image sensor 100 according to the embodiment described earlier in that a single horizontal pixel drive line k is wired in each row and that a plurality (four in this example) of vertical signal output lines vsl are wired in each column.

The CMOS image sensor 100A includes four vertical signal output lines wired in each column, and each four rows of the vertical signal output lines vsl0 to vsl3 are connected to each of the pixel circuit 110a.

The vertical signal output lines vsl0 to vsl3 are wired in each column, and the vertical signal output lines vsl0 to vsl3 share a single AD converter.

In this case, four successive pixels in the column direction form a pixel group PGA, and a row scanning circuit 120A drives and reads each pixel in the pixel group PGA at shifted phases.

Figure 8:
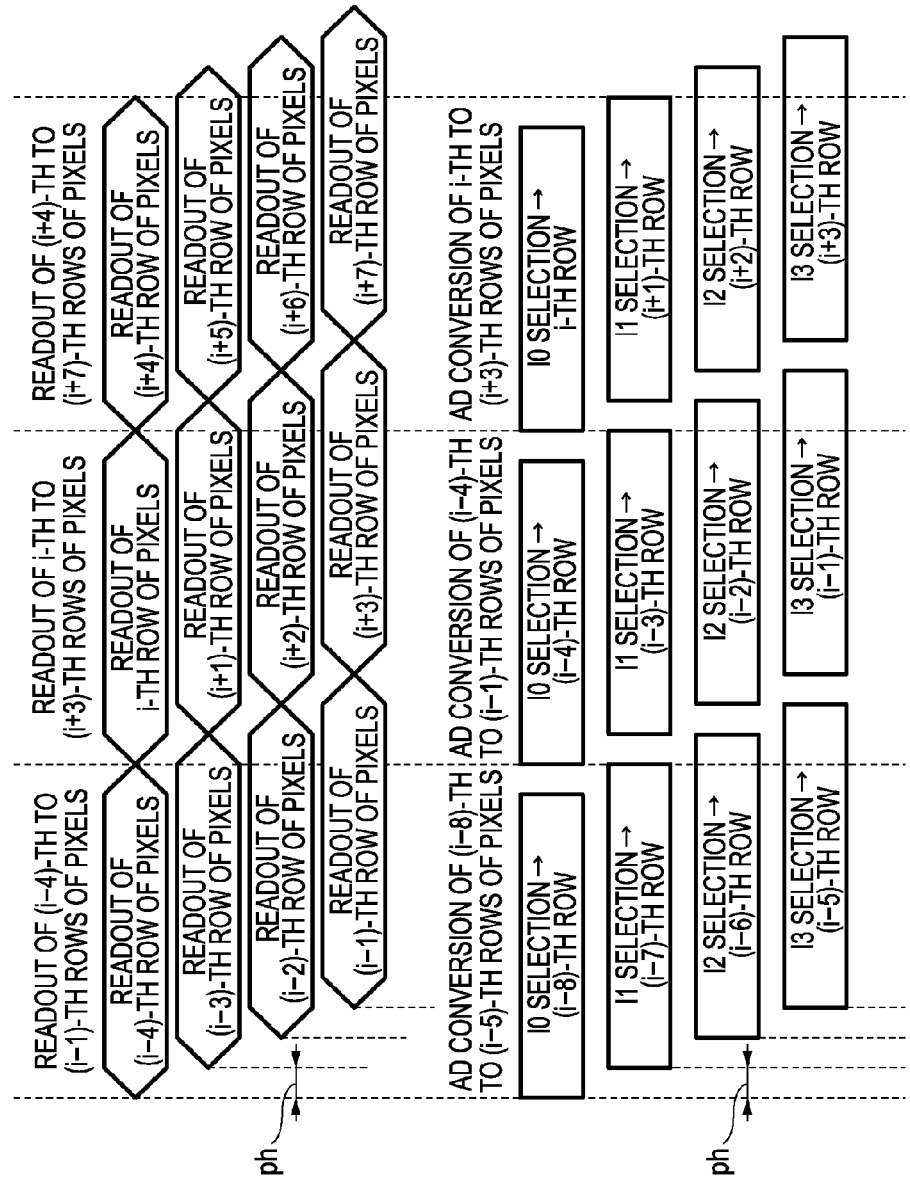
FIG. 8 is a timing diagram of a pixel readout and an AD converting operation performed by the CMOS image sensor according to the other embodiment.

FIG. 8 is a timing diagram of a pixel readout and an AD converting operation performed by the CMOS image sensor according to the embodiment.

Figure 9:
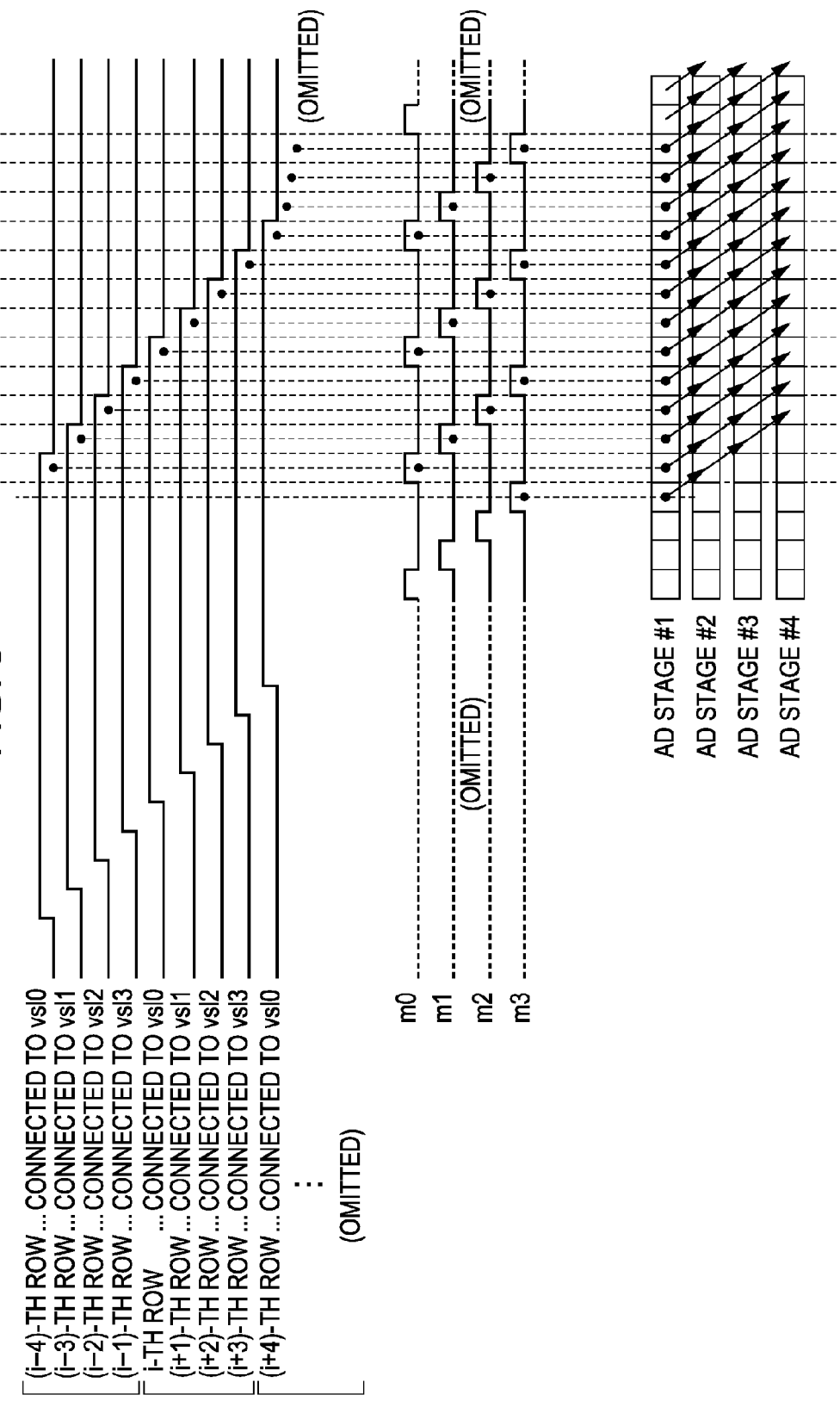
FIG. 9 illustrates an example of driving the entire CMOS image sensor according to the other embodiment.

FIG. 9 illustrates an example of driving the entire CMOS image sensor according to the embodiment. FIG. 9 shows timings of the pixel readout, a selecting operation of the multiplexer, and the AD converting operation.

As described above, according to the embodiment, four vertical signal output lines vsl0 to vsl3 are wired in each column as an example. Furthermore, selection signals (pulse signals) for multiplexers 130A-0 to 130A-10(N) that switch the output signals for sharing the AD converter are denoted as m0 to m3.

The multiplexers 130A-0 to 130A-N are sequentially turned on and off by the selection signals m0 to m3 to select the analog signals read by the vertical signal output lines vsl0 to vsl3 and output them to corresponding AD converters 140A-0 to 140A-10(N).

According to the embodiment, the plurality of vertical signal output lines vsl wired in each column share a single AD converter.

For example, the i-th row, the (i+1)-th row, the (i+2)-th row, and the (i+3)-th row are read out at different timings of overlapping periods, and respectively output to the vertical signal output lines vsl0 to vsl3 in the same pixel column.

They are selected by a multiplexer 130A-i at the readout timing and input to an AD converter 140A-i, whereby the driving operation as shown in FIG. 8 can be realized.

In a horizontal selection circuit 160A, each of switches SW10A to SW17A includes four switches.

According to this embodiment, an effect similar to that of the embodiment described earlier can be obtained.

3. Still Another Embodiment

Figure 10:
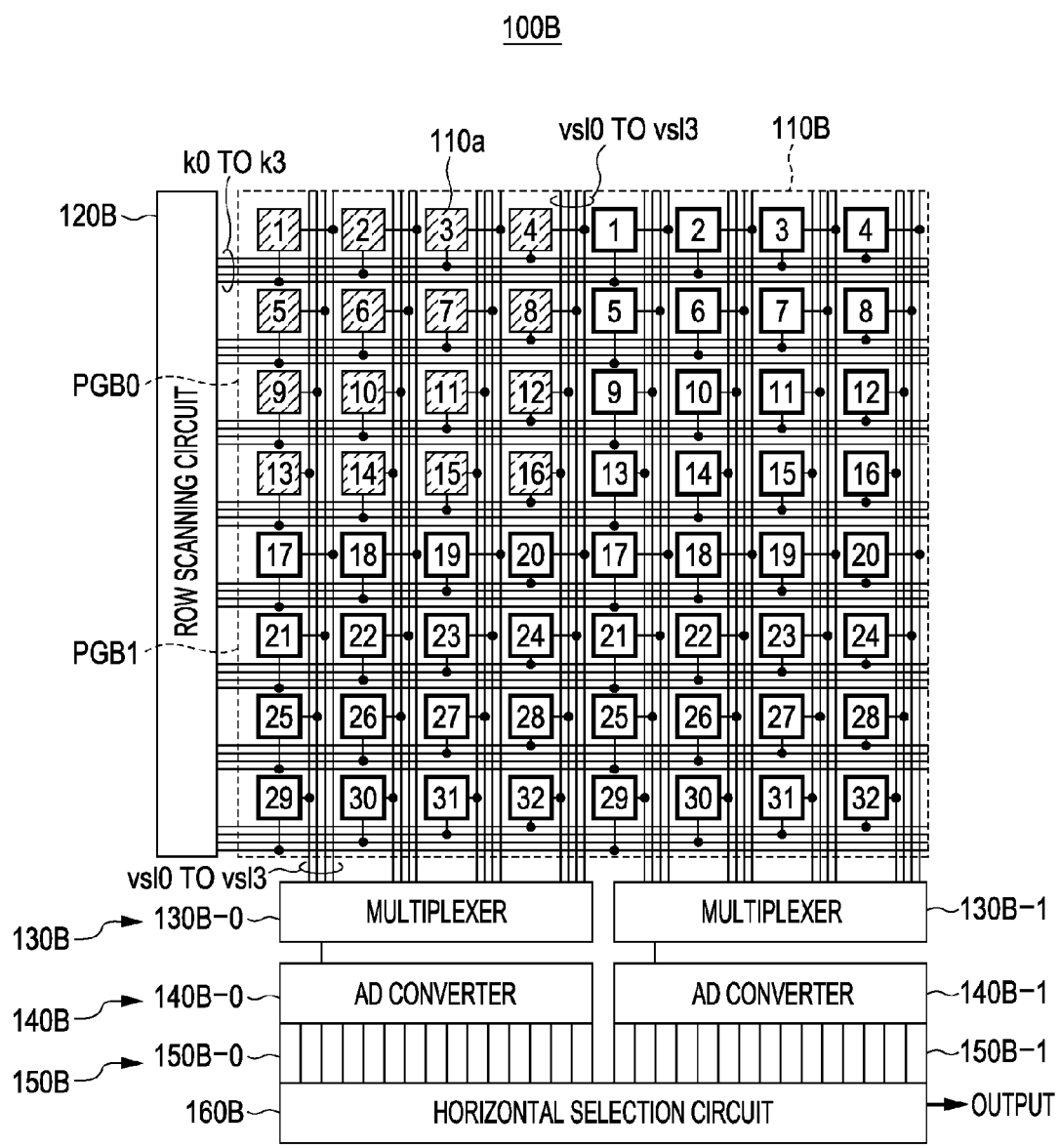
FIG. 10 illustrates an example of the configuration of a solid-state imaging device (CMOS image sensor) according to still another embodiment of the present invention.

FIG. 10 illustrates an example of the configuration of a solid-state imaging device (CMOS image sensor) according to still another embodiment of the present invention.

A CMOS image sensor 100B according to the still other embodiment includes a pixel readout configuration combined with those of the CMOS image sensor 100 and the CMOS image sensor 100A according to the embodiments described earlier.

According to the still other embodiment, the pixels that share a single pipelined AD converter for the same period of time may be arbitrary n×m pixels arranged in a two-dimensional matrix.

In the CMOS image sensor 100B according to the embodiment, a plurality (four in this example) of horizontal pixel drive lines k are wired in each row, and a plurality (four in this example) of vertical signal output lines vsl are wired in each column.

In the CMOS image sensor 100B, for example, in the case of a 4×4 pixel group PGB0, the pixels are read out from reference numerals 1 to 3 assigned to the pixel circuits 110a shown in FIG. 10 at the phases shifted by the amount of ph.

In response to completion of the readout at the shifted phases, a multiplexer 130B-0 selects an input to an AD converter 140B-0.

Digital signals converted by the AD converter are stored in memories 150B-0 and 150B-1, and then sequentially selected and output by a horizontal selection circuit 160B.

According to the embodiment, a plurality of vertical signal output lines in a plurality of columns share a single analog-to-digital converter.

Figure 11:
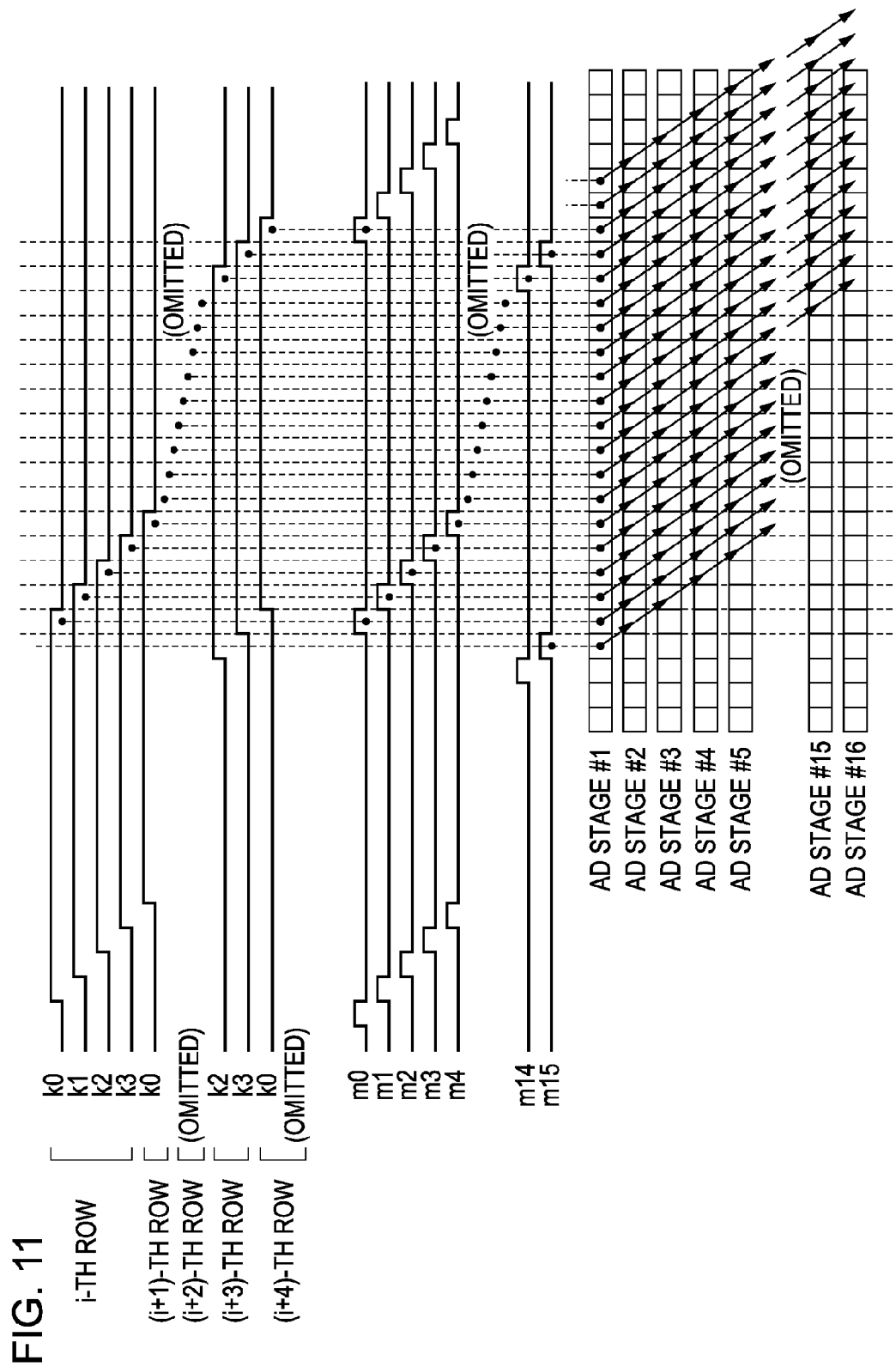
FIG. 11 illustrates an example of driving the entire CMOS image sensor according to the still other embodiment.

FIG. 11 illustrates an example of driving the entire CMOS image sensor according to the embodiment. FIG. 11 shows timings of the pixel readout, a selecting operation of the multiplexer, and the AD converting operation.

As described above, it is assumed herein that each of the AD converters 140B-0 and 140B-1 includes 16 stages, and 4×4 pixels form each of pixel groups PGB0 and PGB1.

As shown in FIG. 10, four horizontal pixel drive lines k0, k1, k2, and k3 are wired in each row, and four vertical signal output lines vsl0 to vsl3 are wired in each column.

Each set of the 4×4 or sixteen vertical signal output lines are selected by the multiplexers 130B-0 and 130B-1 and input to the AD converters 140B-0 and 140B-1. The multiplexers 130B-0 and 130B-1 select the vertical signal output line vsl based on selection signals (pulse signals) m0, m1, m2, . . . , and m15.

A row scanning circuit 120B starts readout operation on the horizontal pixel drive lines k0 to k3 in each row sequentially at the shifted phases, and sequentially inputs signals to the AD converters 140B-0 and 140B-1 upon completion of the readout based on the selection signals m0 to m15.

The signals input to the AD converters 140B-0 and 140B-1 are processed at the first stage AD STAGE #1, and then transferred to the later stage AD STAGE (#2, #3, . . . ).

Because the following input signals can be received once the previous signals are transferred to the next stage, by matching the phase shift of the readout to the cycle of the stages AD STAGE, both the sharing of the AD converter by a plurality of rows and high-speed processing can be realized without using a sample and hold circuit.

4. Yet Another Embodiment

Figure 12:
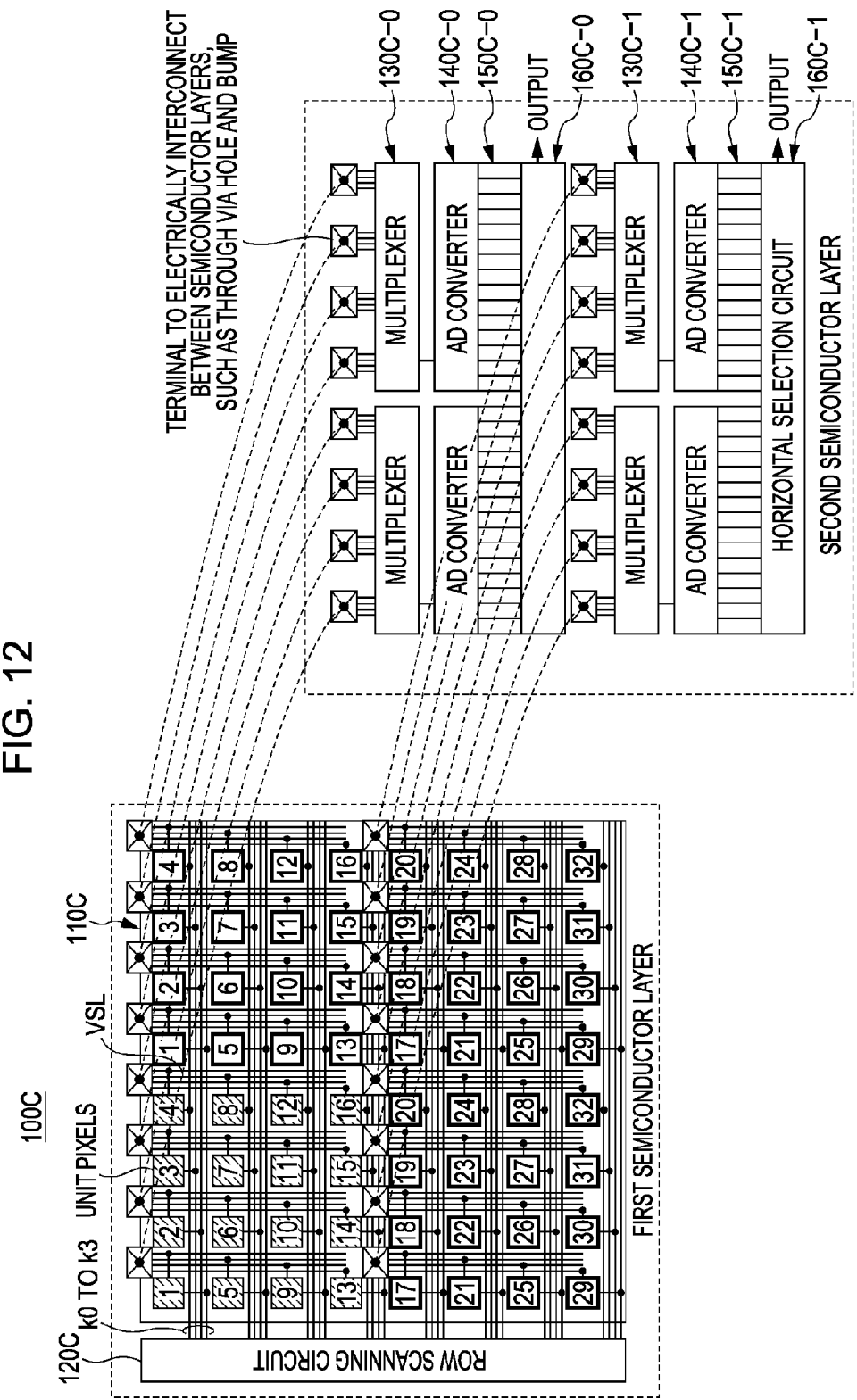
FIG. 12 illustrates an example of the configuration of a solid-state imaging device (CMOS image sensor) according to yet another embodiment of the present invention.

FIG. 12 illustrates an example of the configuration of a solid-state imaging device (CMOS image sensor) according to yet another embodiment of the present invention.

A CMOS image sensor 100C according to the embodiment employs another arrangement of a readout circuit including a multiplexer group 130C, an AD converter group 140C, a memory group 150C, and a horizontal selection circuit 160C.

The AD converters and the like may be disposed above and below the pixel array section, and the AD converter may be shared in units of two-dimensionally arrayed pixels using a lamination structure (three-dimensional structure) of the circuits by through via holes and bump connections.

Sharing the AD converter in units of two-dimensionally arrayed pixels using the three dimensional structure enables a highly parallel AD conversion against a limited number of wired lines, thereby realizing a faster imaging.

In the lamination structure of two or more layers, the multiplexer group 130C, the AD converter group 140C, the memory group 150C, and the readout circuit including the horizontal selection circuit 160C, in the stages after the pixel array section 110C (photo-detector part), may be separated by any border into the layers.

FIG. 12 illustrates an example of the configuration of the CMOS image sensor 100C separated into two layers.

Explanations of the solid-state imaging devices (CMOS image sensors) according to the four embodiments of the present invention were given above.

With a typical image sensor, because a light is emitted from a side of a wiring layer to a light receiving unit (photodiode), as the number of wirings increase in each row and each column, an aperture ratio may lower or the light may be scattered by the wiring layer, thereby disadvantageously decrease the sensitivity.

The decrease of aperture ratio and the increase of the footprint due to the increase of the wirings can be avoided by employing a structure in which the light is irradiated onto a surface opposite to the wiring layer (referred to below as a back surface) to the light receiving unit.

Figure 13:
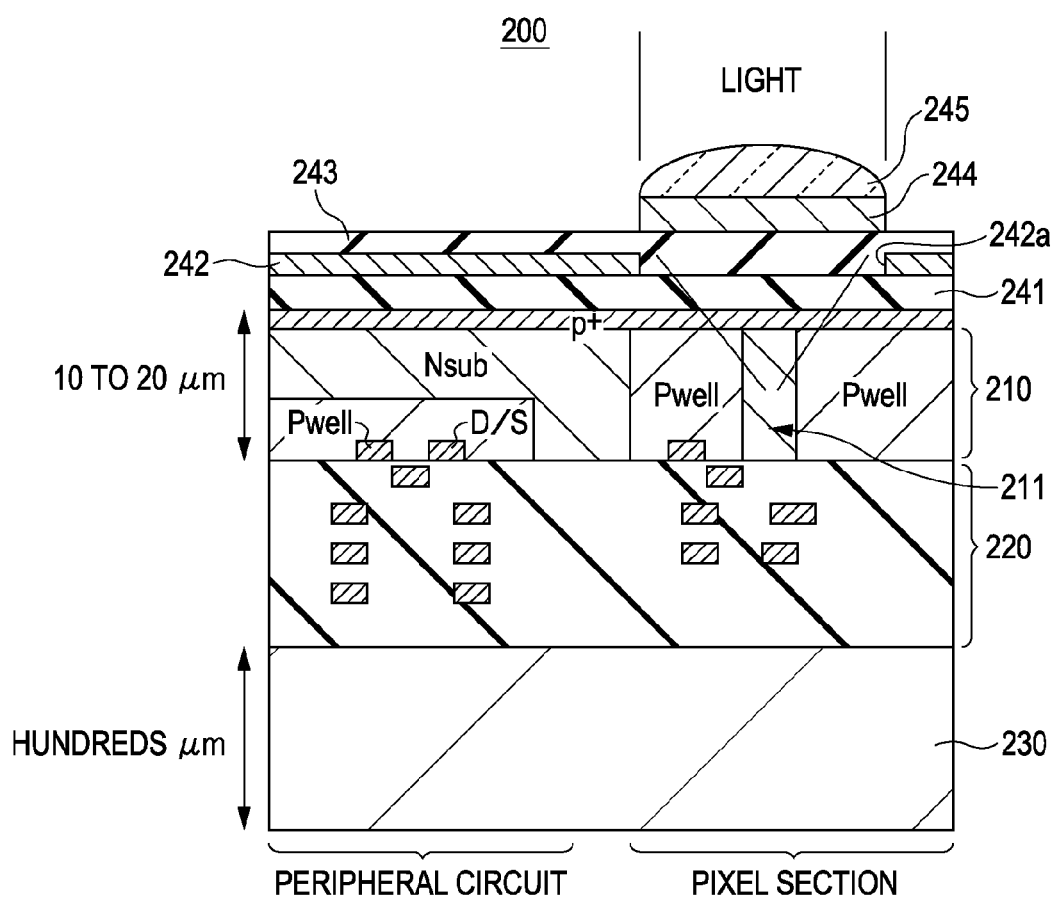
FIG. 13 is a simplified cross sectional view of a typical back-illuminated-type CMOS image sensor.

FIG. 13 is a simplified cross sectional view of a typical back-illuminated-type CMOS image sensor.

A CMOS image sensor 200 includes a back-illuminated-type structure, in which a wiring layer 220 is formed on a surface of a silicon layer 210 formed with a photodiode 211 and a visible light enters another side of the silicon layer 210, i.e., a surface opposite to the wiring layer 220 (back surface).

This structure eliminates a consideration of the light receiving surface for the wiring, allowing more flexibility of the wiring.

In FIG. 13, a reference numeral 230 denotes a substrate support material, a reference numeral 241 denotes an insulating film formed of $SiO_2$, a reference numeral 242 denotes a light shielding film, a reference character 242a denotes an aperture, a reference numeral 243 denotes an insulating film, a reference numeral 244 denotes a color filter, and a reference numeral 245 denotes a microlens.

As described above, the embodiments provide the following effects.

With the solid-state imaging device, a high-speed analog-to-digital conversion can be performed with a small footprint and a low noise.

Furthermore, by using a back-illuminated-type imaging apparatus in which the light enters the back surface opposite to the wiring layer, the horizontal pixel drive lines or the vertical signal output lines may be wired on a pixel domain, thereby avoiding the decrease of the aperture ratio and the increase of the footprint due to the increase of the wirings.

Figure 14A:
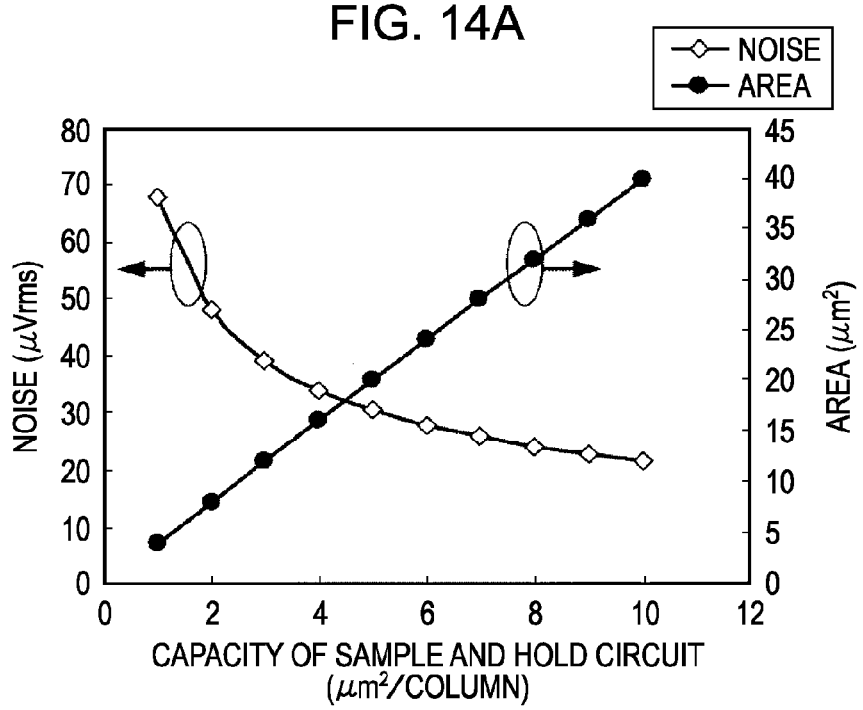
FIGS. 14A and 14B illustrate a noise and a footprint which can be reduced by the embodiments of the present invention.
Figure 14B:
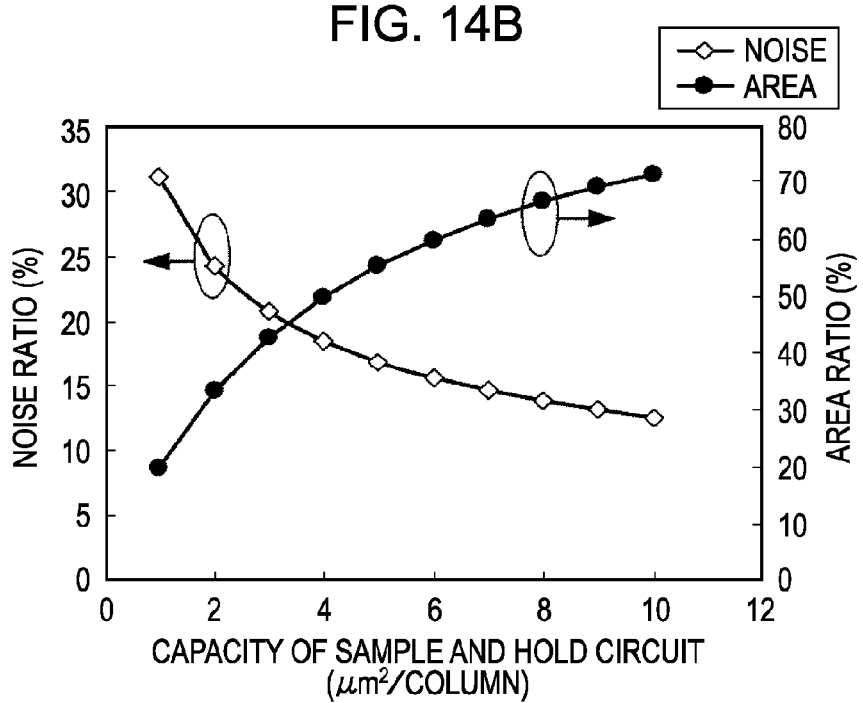

FIGS. 14A and 14B illustrate a noise and a footprint which can be reduced by the embodiments of the present invention.

An image sensor having eight million pixels (4,000 columns×2,000 rows) with an area of each pixel being 2 μm×2 μm is taken as an example.

It is assumed that a capacity of the sample and hold circuit is 1 fF per 1 $\mu m^2$ and that there is no separation or wiring area between elements, for simplification purpose.

FIG. 14A shows capacities used by the sample and hold circuit versus noise amounts generated by the sample and hold circuit and areas occupied by the sample and hold circuit.

FIG. 14B shows the area ratio of the sample and hold circuit against the pixel domain versus the noise ratio of the sample and hold circuit assuming a typical value of the readout noise as 150 μVrms.

Although the noise can be reduced by increasing the capacity, the noise generated by the sample and hold circuit occupies 10% to 30% of the total noise, which remarkably degrades the image quality.

Furthermore, to reduce the noise to about 10% of the total noise, several times of the imaging area should be occupied, which is not realistic.

An area allowed for the sample and hold circuit may be virtually about 20% of the imaging area, which means that about 30% of the noise is generated by the sample and hold circuit.

Because the embodiments of the present invention eliminate any sample and hold circuit, the area and the noise are not increased by the sample and hold circuit, thereby enabling a high-speed imaging with a small footprint and a low noise.

A solid-state imaging device exhibiting such effects may be applied to a digital camera and a video camera as an imaging device.

5. Yet Another Embodiment

Figure 15:
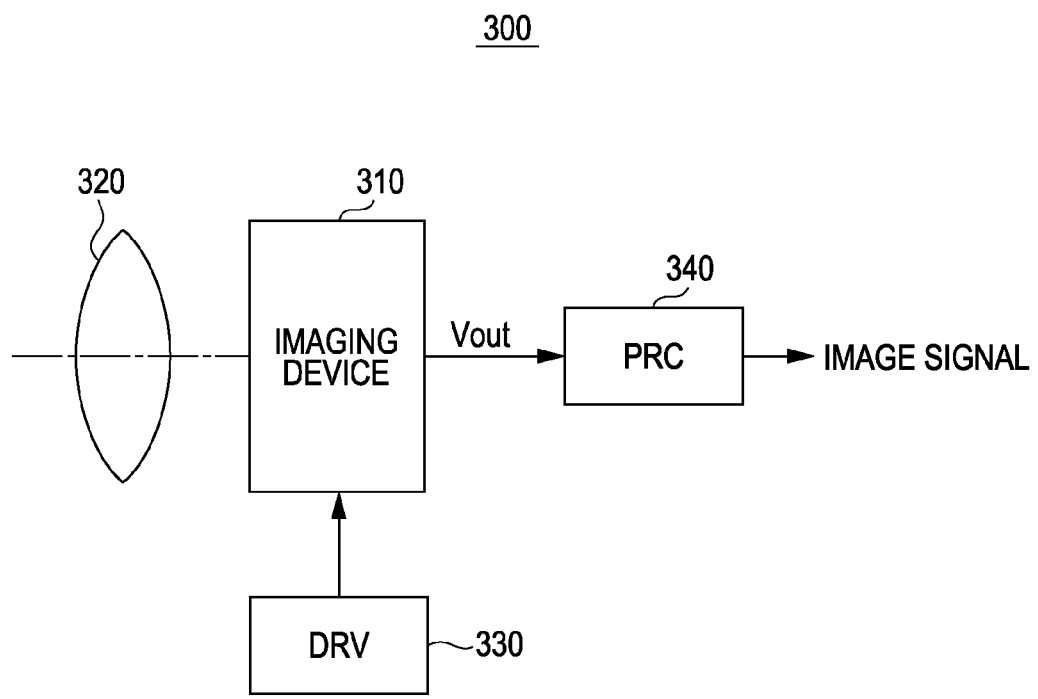
FIG. 15 illustrates an example of the configuration of a camera system to which the solid-state imaging device according to an embodiment of the present invention is applied.

FIG. 15 illustrates an example of the configuration of a camera system to which the solid-state imaging device according to yet another embodiment of the present invention is applied.

As shown in FIG. 15, a camera system 300 includes an imaging device 310 as which the CMOS image sensor (solid-state imaging device) 100, 100A, 100B, or 100C may be used.

The camera system 300 further includes an optical system that introduces an incident light to (forms a subject image on) the pixel domain of the imaging device 310, such as a lens 320 that focuses the incident light (image light) on an imaging surface.

The camera system 300 includes a drive circuit (DRV) 330 that drives the imaging device 310 and a signal processing circuit (PRC) 340 that processes an output signal from the imaging device 310.

The drive circuit 330 includes a timing generator (not shown) that generates various timing signals including a start pulse and a clock pulse for driving circuits in the imaging device 310, and drives the imaging device 310 based on a predetermined timing signal.

The signal processing circuit 340 performs a predetermined signal processing on the output signal from the imaging device 310.

An image signal processed by the signal processing circuit 340 is recorded on a recording medium such as a memory. The image information recorded on the recording medium is output in the form of hard copy by a printer or the like. The image signal processed by the signal processing circuit 340 may be otherwise displayed on a monitor including a liquid crystal display or the like as a moving image.

As described above, by using the imaging device 100, 100A, 100B, or 100C described earlier as the imaging device 310 in an imaging apparatus such as a digital still camera, a high precision camera with a low power consumption can be obtained.

The present application contains subject matter related to that disclosed in Japanese Priority Patent Application JP 2009-094110 filed in the Japan Patent Office on Apr. 8, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a pixel array section with a plurality of pixels arranged in a two-dimensional array with rows and columns, each pixel having a photoelectric conversion function of converting an optical signal into an electric signal, the pixel array being subdivided in to a plurality of groups of pixels;
a pixel drive unit configured to control driving of the pixels in each selected group, the pixel drive unit having respective pixel drive lines associated with the pixels on a row basis;
signal lines associated with the pixels on a column basis and configured to transport electric signals readout from selected pixels;
a multiplexer circuit configured to select signal lines for readout of electric signals from the pixels; and
a readout circuit including the multiplexer circuit, a horizontal scan circuit operative to drive the multiplexer circuit and a respective analog to digital circuit per pixel group configured to convert an analog signal received from the signal lines into a digital signal;
wherein,
at least the number of pixel drive lines wired in each row or the number of signal lines wired in each column is more than one,
said pixel groups are formed of a plurality of the pixels in the pixel array section, the number of the plurality of the pixels being determined by the number of pixel drive lines wired in each row and the number of signal lines wired in each column, the pixels in each pixel group are connected to different lines of either the pixel drive lines or the signal lines,
for each selected pixel group, the pixel drive unit sequentially drives the pixels in the pixel group at overlapping timings of a shifted phase to read out the analog signals through a corresponding one of the signal lines,
for each selected group, the signal lines associated therewith are similarly selected by means of the multiplexer circuit with the timing of the shifted phase,
for each selected pixel group, the analog-to-digital converter is configured to sequentially receive the electric signals read out from the pixel group via the plurality of the signal lines and sequentially convert the analog signals into digital signals, the analog-to-digital converter being a pipelined analog-to-digital converter including a plurality of stages, capable of sequentially receiving inputs, and capable of a pipelined operation so that while the analog-to-digital converter continues to process a given electric signal it receives a succeeding electric signal,
the pixel drive unit sequentially shifts driving operations of the readout performed by the pixel drive lines by a time corresponding to a throughput of the analog-to-digital converter, and
there is no sample and hold circuit between the pixel array and the analog to digital conversion units.

2. The solid-state imaging device according to claim 1,
wherein the signal lines are wired in each column and a pixel group is formed of the plurality of the pixels in a plurality of rows,
wherein one of the pixel drive lines is wired in each row, and
wherein the signal lines wired in each column share a single analog-to-digital converter in the readout circuit.

3. The solid-state imaging device according to claim 2,
wherein the pixel drive lines are wired in each row,
wherein the signal lines are wired in each column,
wherein the pixel group is formed of the plurality of pixels in a plurality of columns and the plurality of pixels in a plurality of rows, and
wherein the signal lines wired in the plurality of the columns share a single analog-to-digital converter in the readout circuit.

4. The solid-state imaging device according to any one of claims 1, 2, and 3,
wherein a photo-detector having a photoelectric conversion function and a peripheral circuit are formed in a lamination structure, and
wherein photo-detectors in each two-dimensional array share the analog-to-digital converter.

5. The solid-state imaging device according to any one of claims 1, 2, and 3,
wherein the solid-state imaging device employs a hack-illuminated-type structure in which a light enters the photo-detector having the photoelectric conversion function from a surface opposite to a wiring layer, and
wherein at least one of the pixel drive line and the signal line is wired on a region of the photo-detector.

6. A camera system comprising:
a solid-state imaging device;
an optical system configured to form a subject image on the solid-state imaging device; and
a signal processing circuit configured to process an image signal output from the solid-state imaging device;
wherein the solid-state imaging device includes:
a pixel array section with a plurality of pixels arranged in a two-dimensional array with rows and columns, each pixel having a photoelectric conversion function of converting an optical signal into an electric signal, the pixel array being subdivided in to a plurality of groups of pixels;
a pixel drive unit configured to control driving of the pixels in each selected group, the pixel drive unit having respective pixel drive lines associated with the pixels on a row basis;
signal lines associated with the pixels on a column basis and configured to transport electric signals readout from selected pixels;
a multiplexer circuit configured to select signal lines for readout of electric signals from the pixels; and
a readout circuit including the multiplexer circuit, a horizontal scan circuit operative to drive the multiplexer circuit and a respective analog to digital circuit per pixel group configured to convert an analog signal received from the signal lines into a digital signal;
and wherein:
at least the number of pixel drive lines wired in each row or the number of signal lines wired in each column is more than one,
said pixel groups are formed of a plurality of the pixels in the pixel array section, the number of the plurality of the pixels being determined by the number of pixel drive lines wired in each row and the number of signal lines wired in each column, the pixels in each pixel group are connected to different lines of either the pixel drive lines or the signal lines, for each selected pixel group, the pixel drive unit sequentially drives the pixels in the pixel group at overlapping timings of a shifted phase to read out the analog signals through a corresponding one of the signal lines, for each selected group, the signal lines associated therewith are similarly selected by means of the multiplexer circuit with the timing of the shifted phase, for each selected pixel group, the analog-to-digital converter is configured to sequentially receive the electric signals read out from the pixel group via the plurality of the signal lines and sequentially convert the analog signals into digital signals, the analog-to-digital converter being a pipelined analog-to-digital converter including a plurality of stages, capable of sequentially receiving inputs, and capable of a pipelined operation so that while the analog-to-digital converter continues to process a given electric, signal it receives a succeeding electric, signal, the pixel drive unit sequentially shifts driving operations of the readout performed by the pixel drive lines by a time corresponding to a throughput of the analog-to-digital converter, and there is no sample and hold circuit between the pixel array and the analog to digital conversion units.

7. The solid-state imaging device according to claim 4,
wherein the solid-state imaging device employs a back-illuminated-type structure in which a light enters the photo-detector having the photoelectric conversion function from a surface opposite to a wiring layer, and wherein at least one of the pixel drive line and the signal line is wired on a region of the photo-detector.

* * * * *